United States Patent
Mestanov et al.

(10) Patent No.: US 10,397,841 B2
(45) Date of Patent: *Aug. 27, 2019

(54) NETWORK NODE AND METHOD FOR HANDLING NETWORK CONNECTIONS

(71) Applicant: Telefonaktiebolaget LM Ericsson (publ), Stockholm (SE)

(72) Inventors: Filip Mestanov, Sollentuna (SE); Guido Hiertz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,628

(22) Filed: Dec. 4, 2017

(65) Prior Publication Data

US 2018/0092009 A1 Mar. 29, 2018

Related U.S. Application Data

(63) Continuation of application No. 14/778,780, filed as application No. PCT/SE2015/050855 on Aug. 6, 2015, now Pat. No. 9,860,809.

(Continued)

(51) Int. Cl.
*H04W 4/00* (2018.01)
*H04W 36/08* (2009.01)
(Continued)

(52) U.S. Cl.
CPC ............ *H04W 36/08* (2013.01); *H04W 36/06* (2013.01); *H04W 36/22* (2013.01); *H04W 48/20* (2013.01);
(Continued)

(58) Field of Classification Search
CPC ..... H04W 36/08; H04W 36/14; H04W 84/12; H04W 36/0055; H04W 36/22
(Continued)

(56) References Cited

U.S. PATENT DOCUMENTS

| | | | |
|---|---|---|---|
| 2003/0174690 A1* | 9/2003 | Benveniste | ........... H04W 74/02 370/350 |
| 2004/0077335 A1* | 4/2004 | Lee | ........................ H04L 63/08 455/410 |

(Continued)

FOREIGN PATENT DOCUMENTS

| | | | | |
|---|---|---|---|---|
| EP | 2 469 936 A1 | 6/2012 | | |
| EP | 2469936 A1 * | 6/2012 | ............ | H04W 8/183 |

(Continued)

OTHER PUBLICATIONS

International Search Report, Application No. PCT/SE2015/050855, dated Oct. 29, 2015.

(Continued)

*Primary Examiner* — Un C Cho
*Assistant Examiner* — Atique Ahmed
(74) *Attorney, Agent, or Firm* — Sage Patent Group

(57) ABSTRACT

A Wireless Local Area Network, WLAN, node and a method performed by the WLAN node for assisting a Station, STA, in selecting a WLAN connection for the STA, The WLAN node provides a first WLAN and a second WLAN with overlapping coverage, the first WLAN providing connections for a first number of STAs and the second WLAN providing connections for a second number of STAs, whereby the second number of STAs is a subset of the first number of STAs. The second number of STAs is being authorized to connect to the second WLAN. The method comprises detecting that the STA connected to or trying to connect to the first WLAN of the WLAN node is authorized to access the second WLAN of the WLAN node and sending a message to the STA comprising an indication to the STA to connect to the second WLAN of the WLAN node.

16 Claims, 7 Drawing Sheets

Related U.S. Application Data

(60) Provisional application No. 62/074,199, filed on Nov. 3, 2014.

(51) Int. Cl.
| | | |
|---|---|---|
| *H04W 76/11* | (2018.01) | |
| *H04W 36/06* | (2009.01) | |
| *H04W 36/22* | (2009.01) | |
| *H04W 48/20* | (2009.01) | |
| *H04W 48/18* | (2009.01) | |
| *H04W 84/12* | (2009.01) | |

(52) U.S. Cl.
CPC ............ *H04W 76/11* (2018.02); *H04W 48/18* (2013.01); *H04W 84/12* (2013.01)

(58) Field of Classification Search
USPC .......................................................... 370/331
See application file for complete search history.

(56) References Cited

U.S. PATENT DOCUMENTS

| | | | | |
|---|---|---|---|---|
| 2005/0059396 A1* | 3/2005 | Chuah | ................... | H04W 24/02 |
| | | | | 455/435.1 |
| 2006/0056348 A1* | 3/2006 | Marinier | ............... | H04W 28/18 |
| | | | | 370/331 |
| 2006/0227972 A1 | 10/2006 | Brok et al. | | |
| 2007/0066306 A1 | 3/2007 | Cheng | | |
| 2008/0031212 A1* | 2/2008 | Ogura | ................... | H04W 28/16 |
| | | | | 370/338 |
| 2008/0096575 A1* | 4/2008 | Aragon | ................. | H04W 36/22 |
| | | | | 455/453 |
| 2011/0110349 A1* | 5/2011 | Grandhi | ................ | H04W 28/18 |
| | | | | 370/338 |
| 2012/0099497 A1 | 4/2012 | Vaidya et al. | | |
| 2012/0196644 A1 | 8/2012 | Scherzer et al. | | |
| 2013/0088983 A1* | 4/2013 | Pragada | ................ | H04W 16/14 |
| | | | | 370/252 |
| 2013/0339502 A1 | 12/2013 | Pitsch et al. | | |
| 2014/0036892 A1* | 2/2014 | Zhu | ....................... | H04W 88/16 |
| | | | | 370/338 |
| 2015/0085844 A1* | 3/2015 | Tian | ...................... | H04W 48/16 |
| | | | | 370/338 |

FOREIGN PATENT DOCUMENTS

| | | |
|---|---|---|
| EP | 2 624 522 A1 | 8/2013 |
| ES | 2 458 621 A | 5/2014 |
| WO | WO 2010/045985 A1 | 4/2010 |
| WO | WO 2011/037298 A1 | 3/2011 |
| WO | WO 2011/039718 A1 | 4/2011 |
| WO | WO 2015/055871 A1 | 4/2015 |

OTHER PUBLICATIONS

Written Opinion of the International Searching Authority, Application No. PCT/SE2015/050855, dated Oct. 29, 2015.
Communication pursuant to Article 94(3) EPC dated Mar. 6, 2018 in corresponding European Patent Application No. 15754309.1, 10 pages.

* cited by examiner

NETWORK NODE AND METHOD FOR HANDLING NETWORK CONNECTIONS

CROSS REFERENCE TO RELATED APPLICATIONS

This application is a continuation application of U.S. patent application Ser. No. 14/778,780, filed Sep. 21, 2015, which itself is a 35 U.S.C. § 371 national stage application of PCT International Application No. PCT/SE2015/050855, filed Aug. 6, 2015, which itself claims priority to U.S. Provisional Application No. 62/074,199, filed Nov. 3, 3014, the disclosures and contents of each of which are incorporated by reference herein in their entirety.

TECHNICAL FIELD

Embodiments herein relate to a network node, such as a WLAN node, a User Equipment (UE), such as a WLAN Station (STA), and methods performed thereby. In particular, they relate to a method for handling network connections, such as WLAN connections, of a UE.

BACKGROUND

A wireless local area network, WLAN, is a wireless network that links two or more devices using a wireless distribution method within a limited area such as a home, school, computer laboratory, or office building. The wireless distribution method may e.g. be spread-spectrum or OFDM radio. This gives users the ability to move around within a local coverage area and still be connected to the network, which network may provide a connection to the wider Internet. Most modern WLANs are based on IEEE 802.11 standards, marketed under the Wi-Fi brand name.

Wireless LANs have become popular in the home due to ease of installation and use, and in commercial complexes offering wireless access to their customers. Such access is often offered for free. Today, many Wireless Internet Service Providers (WISP) have deployments which support both public and private networks at the same time. In those deployments a single network node, such as a WLAN Access Point (AP), may advertise two networks at the same time—one public and one private. Usually, the private network is associated with a particular household and is only available to the people, also referred to as users, that belong to the house hold. The private network employs security mechanisms, which prevent intruders from connecting to that network. On the other hand, the public network usually provides access to a larger number of users, e.g. it could be a network that allows all users to obtain access or could also be a network that provides access to the operator's customers, thereby expending Wi-Fi coverage for those customers. While the operation of the private network is usually limited within one particular household, the public network includes a plurality of network nodes, which provide extensive "blanket" coverage that may span over an entire neighborhood.

The public network might not provide any security mechanisms, while the private one does.

The private network will usually be configured in such a way that it provides better service than the public one. It is common that the private and public network are operated by the same network node. Almost always the network node is collocated with a logically separated Customer Premise Equipment (CPE). The CPE implements routing and access (xDSL, FTTH) capabilities. Thus, public and private network share the same Internet access, prioritizing the private network's traffic over the public network's.

There might be services that are available on the private network only, e.g. connection to a Home Media center, some personalized operator services, etc.

SUMMARY

It is therefore an object of embodiments herein to improve a network connection for a UE in a wireless communications network providing a public network and a private network.

In some example embodiments herein a method is provided by which a network node, such as an AP or a radio access node, which provides e.g. by advertising two different networks, one public and one private, is able to detect that a UE, which in WLAN terminology may be referred to as a Station (STA), which is connected to or tries to connect to the public network should instead be connected to the private network. Having identified such a UE, the network node takes action in order for the UE to connect to the private network instead.

According to a first aspect of embodiments herein, the object is achieved by a method performed by a Wireless Local Area Network, WLAN, node, for assisting a Station, STA, in selecting a WLAN connection for the STA. The WLAN node provides a first WLAN and a second WLAN with overlapping coverage. The first WLAN provides connections for a first number of STAs and the second WLAN provides connections for a second number of STAs. The second number of STAs is a subset of the first number of STAs, which second number of STAs is authorized to connect to the second WLAN. The network node detects that the STA connected to or trying to connect to the first WLAN of the WLAN node is authorized to access the second WLAN of the WLAN node. The WLAN node then sends a message to the STA comprising an indication to the STA to connect to the second WLAN of the WLAN node.

According to a second aspect of embodiments herein, the object is achieved by a method performed by a STA for selecting a WLAN connection. The STA is connected to or tries to connect to a first WLAN provided by the WLAN node, wherein the WLAN node provides a first WLAN and a second WLAN with overlapping coverage. The first WLAN provides connections for a first number of STAs and the second WLAN provides connections for a second number of STAs. The second number of STAs is a subset of the first number of STAs, the second number of STAs being authorized to connect to the second WLAN. The STA receives a message from the WLAN node, the message comprising an indication to connect to a second WLAN provided by the WLAN node.

According to a third aspect of embodiments herein, the object is achieved by a WLAN node for assisting a STA in selecting a WLAN connection for the STA. The WLAN node comprises a detecting module configured to detect that a STA connected to or trying to connect to a first WLAN of the WLAN node has the right to access a second WLAN of the WLAN node. The WLAN node further comprises a sending module configured to send a message to the STA comprising an indication to the STA to connect to the second WLAN of the WLAN node.

According to a fourth aspect of embodiments herein, the object is achieved by a Station, STA, for selecting a WLAN connection, which STA is connected to or is trying to connect to a first WLAN provided by the WLAN node. The STA comprises a receiving module configured to receive a message from the WLAN node. The message comprises an indication to connect to a second WLAN provided by the WLAN node. The STA further comprises a performing module configured to perform a hand over from the first WLAN to the second WLAN according to the indication in the message received from the WLAN node.

Embodiments described herein provide a mechanism by which the network node such as a WLAN node is able to steer or allocate a STA to the most appropriate network, which is usually the private one, even when another alternative network, usually the public one, is available and the STA is trying to connect to the public network or is connected to the public network. By doing so, the user experience and user privacy is improved and the network resources are optimally used.

Being connected to the private network does satisfy a user's expectation that when being at home his STA should instantaneously have access to all of the user's private or personal services.

By steering the STA to the second WLAN according to the embodiments described above it can be ensured that the user always has access to the services provided by the second WLAN as soon as the user enters his household.

A further benefit with the embodiments described is that, the STA of the user is steered to a more secure connection, which reduces the risk of someone intercepting the communication between the STA and the WLAN node.

Yet another benefit with the above embodiments is that resources are made available in the first WLAN since STAs are forced to move, e.g. by performing a hand over, from the first to the second network.

In the following section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments. Although specific terms may be employed herein, they are used in a generic and descriptive sense only and not for purposes of limitation.

BRIEF DESCRIPTION OF THE DRAWINGS

Examples of embodiments herein are described in more detail with reference to attached drawings in which.

DETAILED DESCRIPTION

Figure 1:
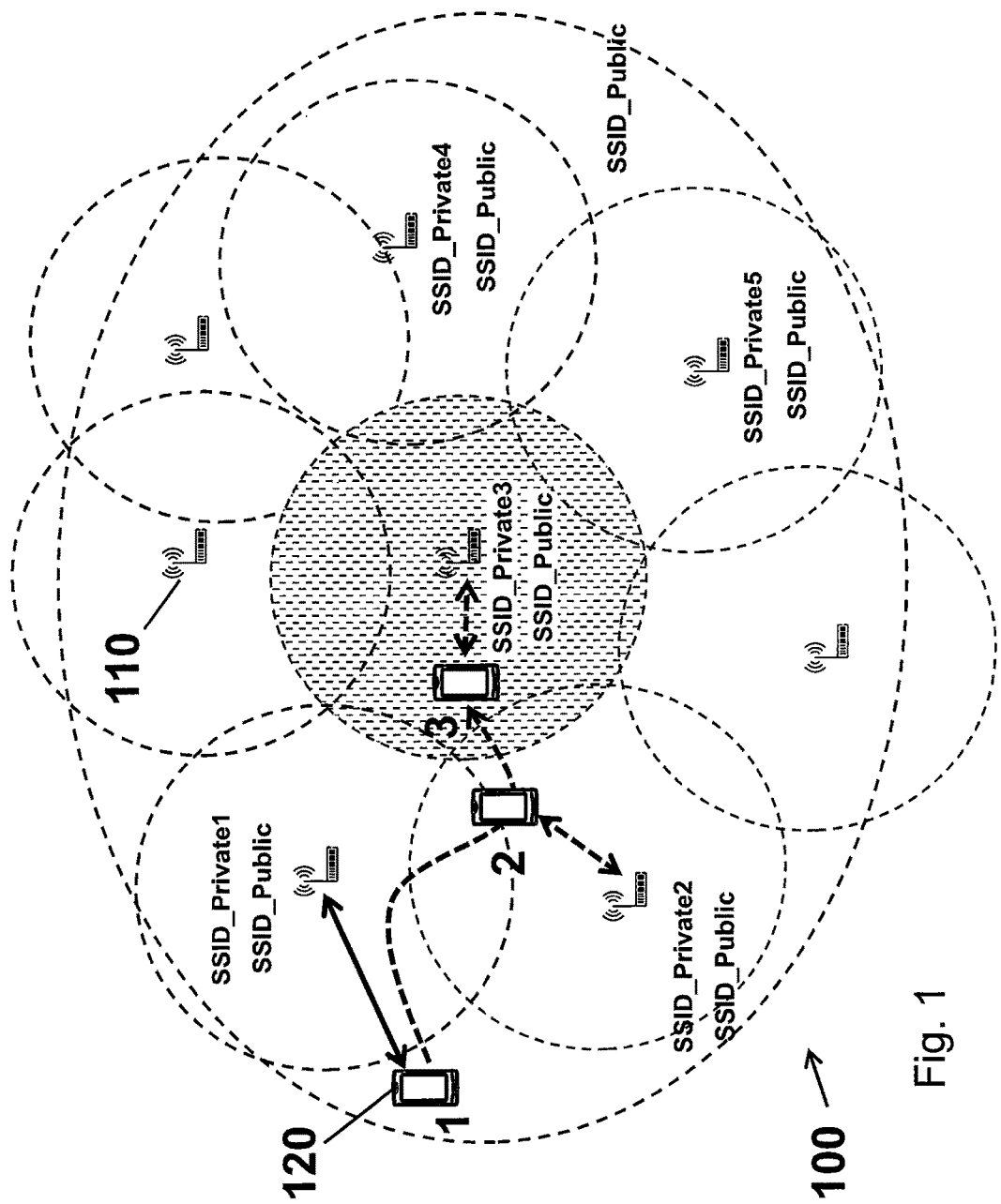
FIG. 1 is a schematic diagram illustrating a first scenario in a wireless communications network.

The following common terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Access Point, AP, Node B, base station, BS, Multi-Standard Radio, MSR, radio node such as MSR BS, eNode B, network controller, Radio Network Controller, RNC, base station controller, relay, donor node controlling relay, base transceiver station, BTS, transmission points, transmission nodes, Remote Radio Unit, RRU, Remote Radio Heads, RRH, nodes in Distributed Antenna System, DAS, etc.

Network node: In some embodiments a more general term "network node" is used and it can correspond to any type of radio network node or any network node, which communicates with at least a radio network node. Examples of network node are any radio network node stated above, core network node (e.g. Mobile Switching Centre, MSC, Mobile Management Entity, MME, etc.), Operations & Maintenance, O&M, Operations Support System, OSS, Self-Organizing Networks, SON, positioning node (e.g. E-SMLC), MDT etc.

Basic Service Set, BSS: The basic service set is a set of all stations that can communicate with each other. Every BSS has an Identification, ID, called the BSSID, which may be the MAC address of the access point servicing the BSS. There are two types of BSS: Independent BSS, IBSS, and infrastructure BSS. The IBSS is an ad hoc network that contains no access points, which means they cannot connect to any other basic service set.

User Equipment (UE): In some embodiments the non-limiting term UE is used and it refers to any type of wireless device communicating with a radio network node in a cellular or mobile communication system. Examples of UE are WLAN Stations (STA), target device, device to device UE, machine type UE or UE capable of machine to machine communication, PDA, iPAD, Tablet, mobile terminals, smart phone, Laptop Embedded Equipment, LEE, Laptop Mounted Equipment, LME, USB dongles etc.

Stations, STA: All components that can connect into a wireless medium in a network are in WLAN terminology referred to as stations. All stations are equipped with wireless network interface controllers, WNICs. Wireless stations fall into one of two categories: wireless access points, and clients. Access points, APs, normally wireless routers, are base stations for the wireless network. They transmit and receive radio frequencies for wireless enabled devices to communicate with. Wireless clients can be mobile devices such as UEs, laptops, personal digital assistants, IP phones and other smartphones, or fixed devices such as desktops and workstations that are equipped with a wireless network interface.

Also note that terminology such as network node and UE should be considering non-limiting and does in particular not imply a certain hierarchical relation between the two; in general "network node" may be considered as device 1 and "UE" device 2, and these two devices communicate with each other over some radio channel. Herein, we also focus on wireless transmissions in the downlink, but the embodiments herein are equally applicable in the uplink.

In IEEE 802.11 there are two basic modes of operation, ad hoc mode and infrastructure mode. In ad hoc mode, mobile units transmit directly peer-to-peer. In infrastructure mode, mobile units communicate through an access point that serves as a bridge to other networks, such as Internet or a Local Area Network, LAN.

Since wireless communication uses a more open medium for communication in comparison to wired LANs, IEEE 802.11 also includes encryption mechanisms: Wired Equivalent Privacy, WEP, Wi-Fi Protected Access, WPA or WPA2, to secure wireless computer networks. Many access points will also offer Wi-Fi Protected Setup, which is a quick method of joining a new device to an encrypted network.

Wireless distribution system, WDS: A Wireless Distribution System enables the wireless interconnection of access points in an IEEE 802.11 network. It allows a wireless network to be expanded using multiple access points without the need for a wired backbone to link them, as is traditionally required. The notable advantage of WDS over other solutions is that it preserves the MAC addresses of client packets across links between access points.

Access Point, AP: An access point may be either a main, relay or remote base station. A main base station is typically connected to the wired Ethernet. A relay base station relays data between remote base stations, wireless clients or other relay stations to either a main or another relay base station. A remote base station accepts connections from wireless clients and passes them to relay or main stations. Connections between "clients" are made using MAC addresses rather than by specifying IP assignments.

All base stations in a Wireless Distribution System must be configured to use the same radio channel, and share WEP keys or WPA keys if they are used. They can be configured to different service set identifiers. WDS also requires that every base station be configured to forward to others in the system as mentioned above.

WDS may also be referred to as repeater mode because it appears to bridge and accept wireless clients at the same time, unlike traditional bridging. It should be noted, however, that throughput in this method is halved for all clients connected wirelessly.

When it is difficult to connect all of the access points in a network by wires, it is also possible to put up access points as repeaters.

Roaming: There are two definitions of wireless roaming, internal and external.

Internal Roaming: The UE moves from one AP to another AP within a home network because the signal strength is too weak. An authentication server (RADIUS) performs the re-authentication of MS via 802.1x (e.g. with PEAP). The billing of QoS is in the home network. A UE roaming from one access point to another often interrupts the flow of data among the Mobile Station and an application connected to the network. The Mobile Station, for instance, periodically monitors the presence of alternative access points, which may provide a better connection. At some point, based on proprietary mechanisms, the UE may decide to re-associate with an access point having a stronger wireless signal.

External Roaming: The UE moves into a WLAN of another Wireless Internet Service Provider, WISP, and may use their services, which is also referred to as a Hotspot. The user can independently of his home network use another foreign network, if this is open for visitors. There may be special authentication and billing systems for mobile services in a foreign network.

FIG. 1 shows an example of a communications network 100 comprising both one or more public networks and one or more private networks such as WLANs. As seen in the figure, the network 100 comprises several network nodes, such as a network node 110, wherein the network node 110 may be referred to as an AP, a radio access node or a WLAN node. In some embodiments the network may comprise a plurality of network nodes, such as a plurality of WLANs. The network node 110 provides access to, by e.g. advertising support for two networks—a first public network and a second private network, such as a first and a second WLAN. The public network is identified with an identifier of the public network, such as e.g. SSID_Public, which may be common for all network nodes in the network. The private network is individual for each network node and is identified with an identifier of the private network, such as e.g. SSID_Private1, SSID_Private2, etc. Since all network nodes use the same identification for the public network, the public network may include several network nodes and thereby covers a larger area, e.g. a neighborhood. In FIG. 1, an example scenario is depicted in which a person, who may also be referred to as a user, is moving towards his home network, e.g. by walking home from work, while using a STA 120: The STA 120 employs a WLAN radio which is able to give access to the public and the private WLAN. The person lives in an area covered by a public network, so the STA 120 has access to a private network at the users home. In this example the private network of the STA 120 is identified with SSID_Private3. The following happens when the user walks towards his home network:

1. The moment the STA 120 moves into an area covered by the network, the STA 120 automatically associates, i.e. connects, with the public network, since the private network is not in coverage.
2. As the person walks towards his/her home, the STA 120 will keep being connected to the public network, each time associating, i.e. connecting, with the network node 110 providing the highest signal strength (RSSI).
3. Once the person arrives at home, his/her STA 120 will associate with the public network advertised with SSID_Public, which his/her home network node 110 advertises, since this was the network the STA 120 was previously connected to. The home network node may be a network node such as the network node 110, which is situated in or close to the users home, and which recognizes the STA 120 of the user.

In some of the embodiments herein, when a STA 120 that has access to the private network, connects to the public network, the network node 110 may take action to suggest to this STA 120 that it moves to, which may also be referred to as a hand over or connect to, the private network instead. When the indication suggests to the STA to move, i.e. perform the hand over to the private network, the network node indicates to the STA to evaluate a connection to the private network. If the STA, after performing the evaluation, considers that the connection to the second network, i.e. the private network, provides a better service than the public network, the STA may decide to connect to, i.e. perform the handover to the private network. The STA may however also decide to stay connected to the first network. If the STA decides to stay connected to the first network even though the network node has suggested performing a hand over to the second network, the network node may send the indication commanding the STA to connect to the second network. When the STA receives the indication commanding the STA to perform the hand over, the STA is forced to connect to the second network without performing the evaluation.

Figure 2:
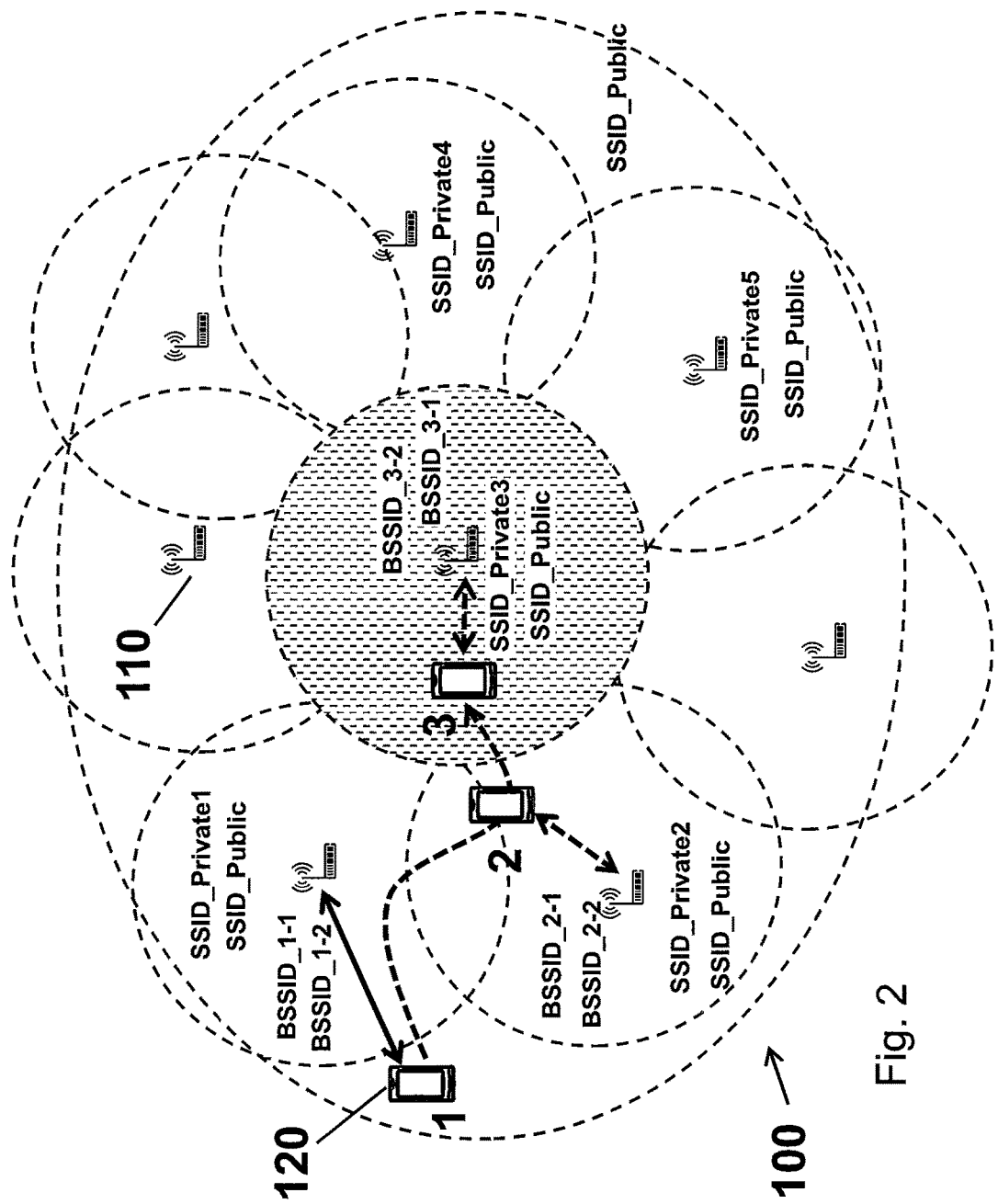
FIG. 2 is a schematic diagram illustrating a second scenario in a wireless communications network.

This scenario is depicted in FIG. 2. In scenarios where the network selection mechanism is controlled by the network, the network node 110 may alternatively command, i.e. steer the STA 120 to the private network. In this scenario no indication to evaluate the connection is sent in the message from the network node 110 to the STA 120. The network node 110 together with the associated STAs 120 are commonly referred to as a Basic Service Set, BSS. Each BSS is uniquely identified by a Basic Service Set Identification, BSSID. For a BSS operating in infrastructure mode, the BSSID may be the MAC address of the network node 110. In one embodiment the first, e.g. the public, and the second, e.g. the private, network of the network node 110 each have their own BSSID, i.e. each SSID has its own BSSID. This embodiment is shown in FIG. 2.

Figure 3:
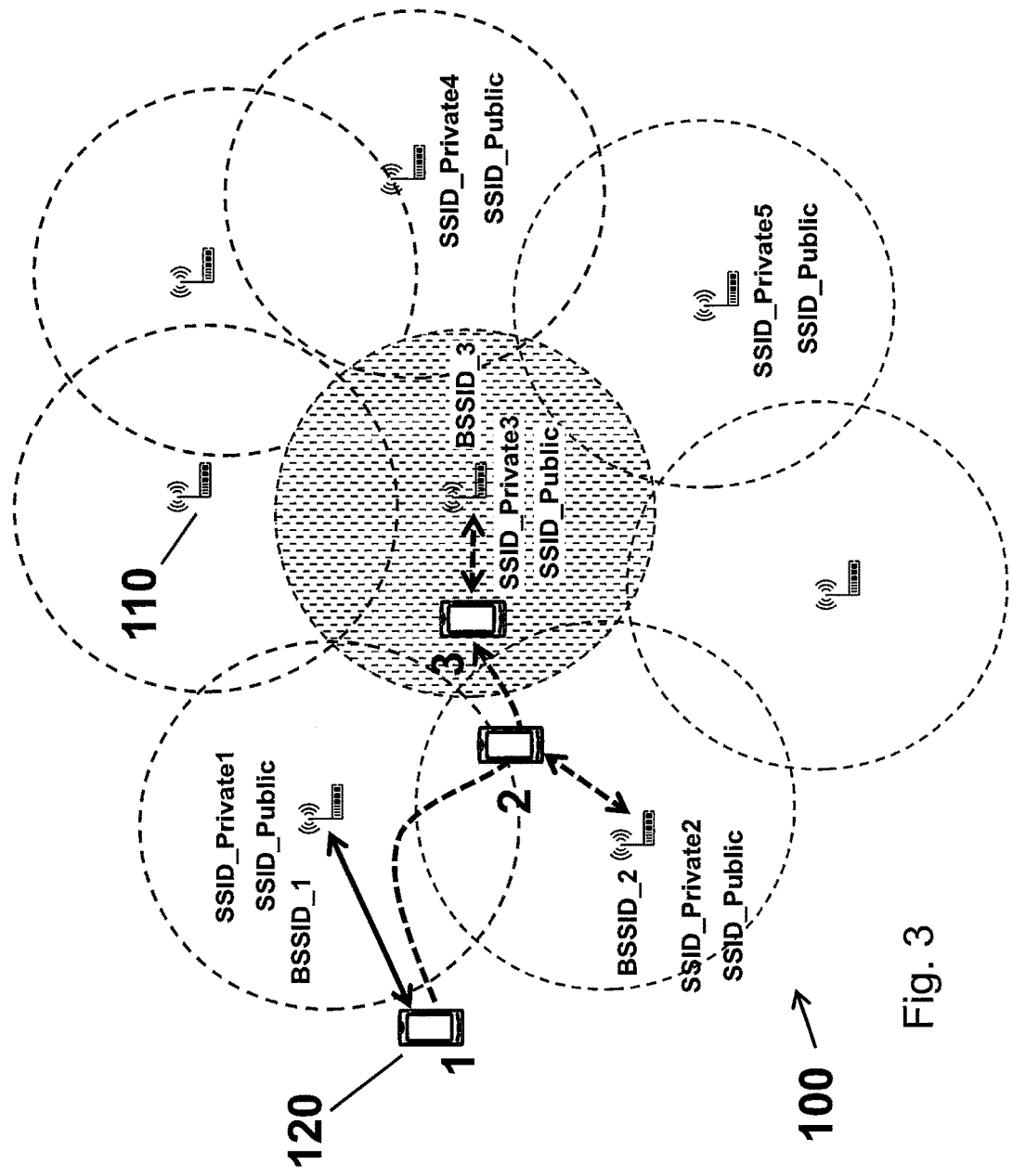
FIG. 3 is a schematic diagram illustrating a third scenario in a wireless communications network.

FIG. 3 depicts a further scenario where the SSIDs of the private and the public network of each network node 110 share the same BSSID. In this scenario, the network nodes each only have one MAC address, therefore other wireless devices will observe only one BSSID when scanning. There are however two SSIDs associated with that one MAC address. When other devices, such as e.g. UEs or STAs, associated with the network node communicate with the network node, the devices will exchange frames with that particular BSSID. The network node therefore may have to provide mechanisms to differentiate traffic intended for each SSID. In some embodiments of the method disclosed herein, the message sent to the STA from the WLAN node may comprise SSID information of the private and the public network.

In a further embodiment herein, the STA 120 may actively scan for network nodes 110 to connect to. STAs 120 may generate a so called Probe Request frames that are used to discover neighboring network nodes 110. Using active scanning, a STA 120 may call out for all network nodes 110 to respond, which is also referred to as wildcard SSID, or only for those network nodes 110 to respond, that serve those SSIDs which the STA 120 may have listed in the Probe Request frame. If the STA 120 actively scans using the wildcard SSID, or if the STA 120 actively scans for at least the private network and other networks, and if the network node 110 serves the private network that this STA 120 previously had access to, then this network node 110 does not respond with its public network SSID but only with its private network SSID. Thus, the STA 120 can easily identify its private (home) network and is prevented from attempting to access the public network served on this network node 110. Furthermore, in not replying to the STA's 120 probe request through the network node's 110 public network the network node 110 reduces airtime consumption since it does not send unnecessary Probe Response frames.

In yet another embodiment, when the network node 110 detects that the STA 120 is connected to the public network, but has access to the private network, the network node 110 takes action. One possible option is to suggest that the STA 120 moves to, e.g. by connecting or performs a hand over, to the private network instead. This could for example be done by sending a message to the STA 120, indicating that the STA 120 should move to, e.g. connect to, the private network. This may also be referred to as performing a hand over from the public to the private network. One such message could be a Basic Service Set (BSS) Transition Management Request, as described in IEEE Standard 802.11-2012, or a modified BSS Transition Management Request frame.

In another embodiment, the BSS Transition Management Request frame may be modified in order to include an information element, containing a Service Set Identifier, SSID, information. In this case, the network node 110 may send a BSS Transition Management Request frame to the STA 120, indicating a SSID to which the STA 120 should transition. One option for realizing this may be to extend the BSS Transition Management Request frame with a SSID element (as specified in 802.11-2012). Another option may be to extend the BSS Transition Management frame with a vendor-specific information element, which carries information about an SSID.

Figure 4:
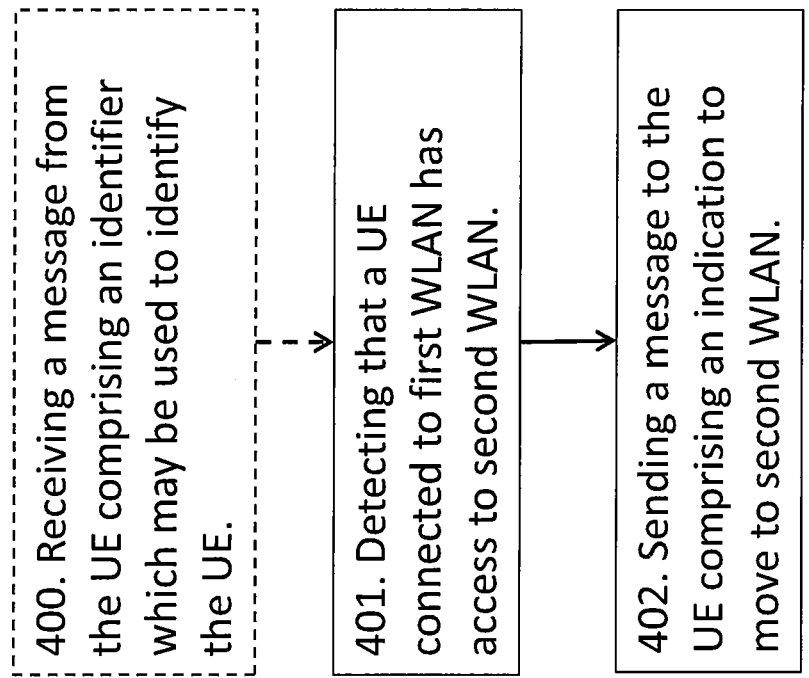
FIG. 4 is a flowchart depicting embodiments of a method performed by a network node.

Examples of embodiments of a method performed by the network node 110 for handling network connections of a STA 120, will now be described with reference to a flowchart depicted in FIG. 4. The network node provides a first public network and a second private network, such as a first and a second WLAN. The first network, which may also be referred to as the public network, provides connections for a first number of STAs and the second network, also referred to as the private network, provides connections for a second number of STAs. The second number of STAs is a subset of the first number of STAs, which subset may be authorized to connect to, which may also be referred to as access, the second network of the network node 110. In the following examples the public network may be a first WLAN and the private network may be a second WLAN provided by a WLAN node.

Action 400

The network node may comprise the action of receiving an identifier, which may be used by the network node to identify that the STA has the right to access the second WLAN of the network node. The identifier may e.g. be a MAC address, an authentication identifier, an International Mobile Subscriber Identity, IMSI, or any other type of identification which may be used by the network node to identify the STA. This action is not mandatory and is marked with dashed lines in FIG. 4.

Action 401

When a STA 120 connects to the WLAN node 110 which supports both a first and a second WLAN, the WLAN node may decide or detect whether the STA should be connected to the second or first WLAN based on an implemented algorithm.

One possible way to determine this is if the STA has previously been connected to the second WLAN, the WLAN node remembers said STA based on an STA identifier, which may be a MAC address of the STA. Therefore, the WLAN node 110 may build and keep a list of STAs which are allowed to be connected to the second WLAN, which may also be referred to as have access to or being authorized to or having permission to access the second WLAN.

The WLAN node may also be provisioned with a list of such STA. The provisioning may be either a one-time event or may be done periodically. The provisioning may be based on an Operation and Management, O&M, system, maintained by an operator or may be based on user input, i.e. the user may define which STAs are allowed to have access to his/her private network, such as the second WLAN. Furthermore, the STAs MAC address may be linked to a user profile.

Action 402

When the WLAN node has detected that the STA has access rights to access the second WLAN, the WLAN node sends a message to the STA. The message comprises an indication related to a movement to the private network, which indication may be at least one out of an indication suggesting to the STA to move to the second WLAN, and an indication commanding, which may also be referred to as steering, the STA to move to the second WLAN.

The WLAN node detects that a STA, which is connected to or is trying to connect to the first WLAN of the WLAN node is authorized to access the second WLAN of the WLAN node. The WLAN node then sends a message to the STA comprising an indication to connect to the second WLAN of the WLAN node.

It is worth noting that the messages sent in step 402 are mutual alternatives, but may also be used consecutively. The WLAN node may e.g. send a message comprising the suggestion to the STA 120 first and then if the STA 120 does not take the suggestion, e.g. if the STA 120 decides to stay connected to the first WLAN after having performed the evaluation, the WLAN node 110 may send a second message comprising the command or the steering.

Figure 5:
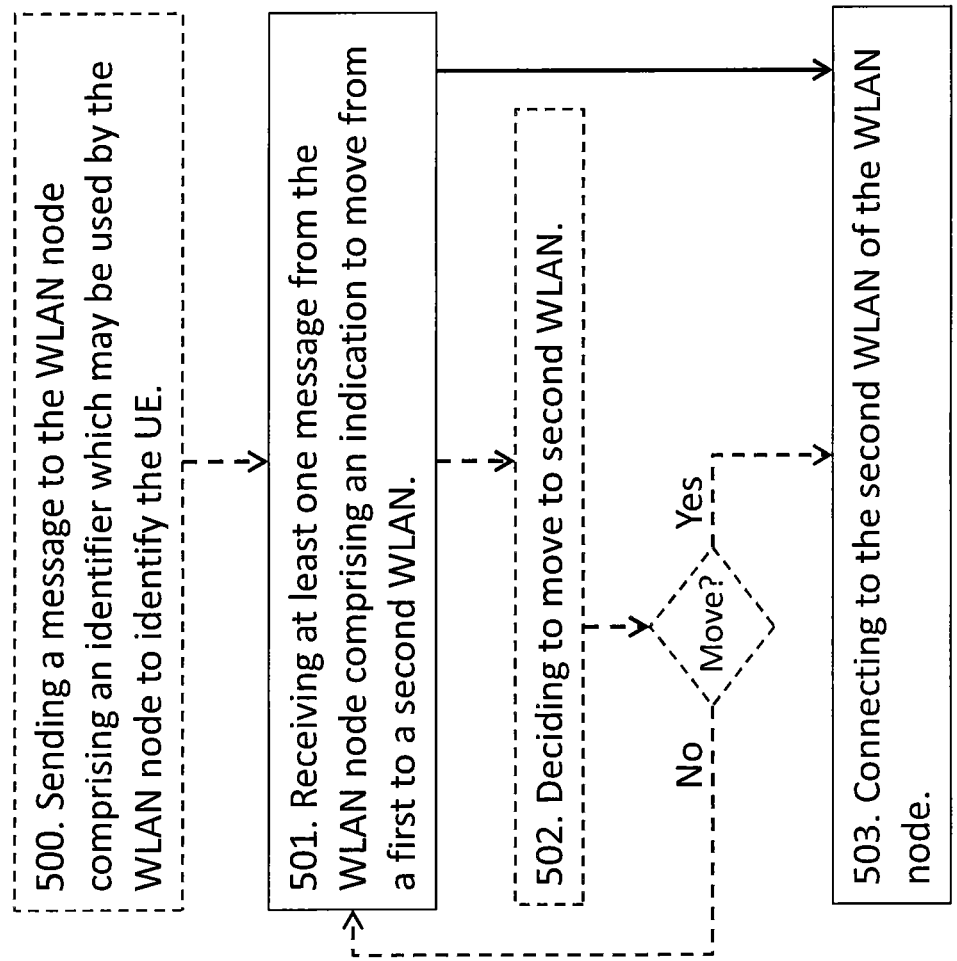
FIG. 5 is a flowchart depicting embodiments of a method performed by a STA.

FIG. 5 discloses method actions according to some embodiments performed in the STA 120 for selecting a network connection, such as a WLAN connection, as described above. Dashed lines of a box indicate that this action is not mandatory. In the following examples the public network may be a first WLAN and the private network may be a second WLAN provided by a WLAN node. The STA 120 is connected to or is trying to connect to a first WLAN provided by the WLAN node 110, such as the first WLAN provided by the WLAN node.

Action 500

The STA 120 may send an identifier to the WLAN node 110, which may be used by the WLAN node to identify that the STA 120 is authorized to access the second WLAN of the WLAN node 110.

The identifier may be a MAC address, an authentication identifier, an International Mobile Subscriber Identity, IMSI, or any other type of identification which may be used by the WLAN node 110 to identify the STA 120.

Action 501

The STA 120 receives a message from the WLAN node 110, the message comprising an indication to move to, which may also be referred to as connect to or perform a handover to, the second WLAN provided by the WLAN node 110. The indication may indicate to the STA 120 to connect to the second WLAN of the WLAN node 110, by commanding, which may also be referred to as steering the STA to the second WLAN. The indication may indicate suggesting to the STA to move to the second WLAN of the WLAN node.

Action 502

When the indication indicates suggesting to the STA 120 to move to the second WLAN, the STA 120 may decide to move to the second WLAN or to stay connected to the first WLAN. In order to make the decision the STA may evaluate the connection to the second WLAN of the WLAN node 110. If the STA, after performing the evaluation, considers that the connection to the second WLAN provides a better service than the first WLAN, the STA may connect to, i.e. perform a handover to the second WLAN. The STA may however also stay connected to the first WLAN. If the STA decides to stay connected to the first WLAN even though the WLAN node has suggested performing a hand over to the second WLAN, the STA may receive a second message comprising an indication commanding the STA to connect to the second WLAN.

Action 503

The STA 120 further performs a move from the first WLAN to the second WLAN according to the indication in the message received from the WLAN node. If the STA, after performing the evaluation, considers that the connection to the second WLAN provides a better service, the STA may decide to move to, e.g. by performing a handover or connecting to, the second WLAN. When the STA receives the indication commanding the STA to perform the hand over, the STA performs the hand over to the second WLAN without performing the evaluation. This may also be referred to as the STA being forced to connect to the second WLAN.

Figure 6:
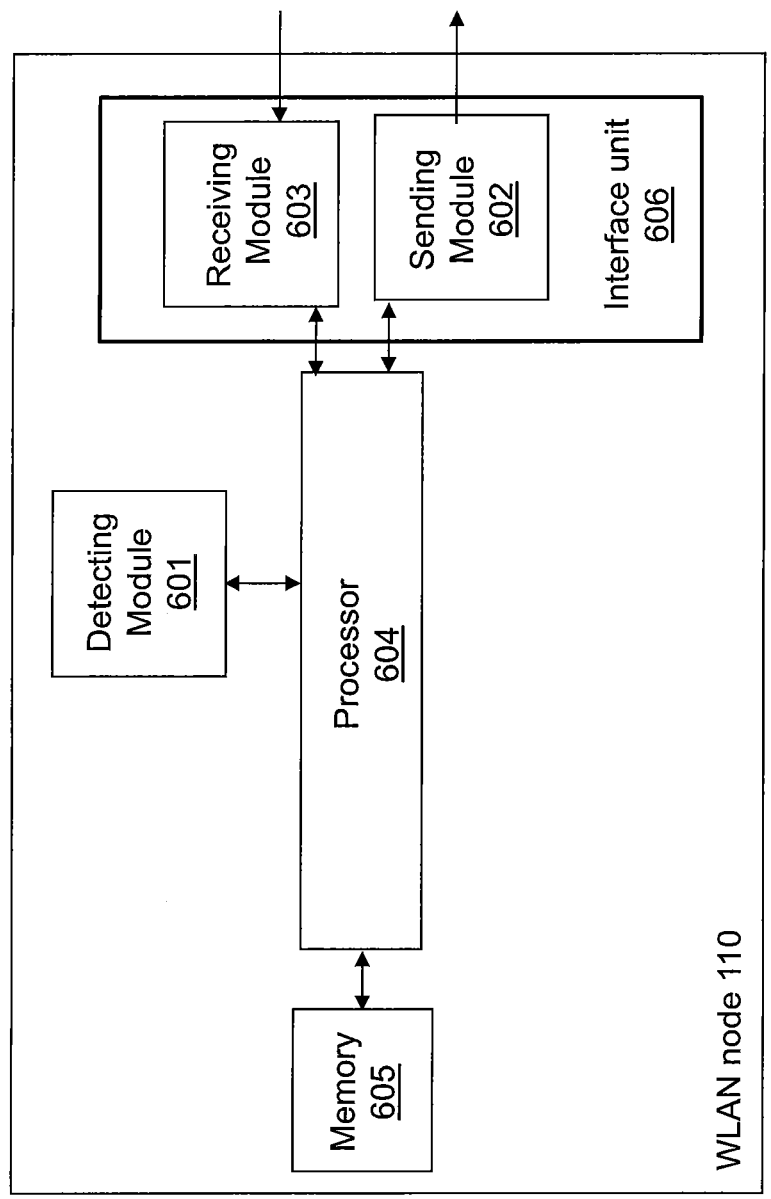
FIG. 6 is a schematic block diagram illustrating embodiments of a network node.

To perform the method actions for handling network connections of a STA 120 described above in relation to FIG. 4, the WLAN node 110 may comprise the following arrangement depicted in FIG. 6. As mentioned above the WLAN node 110, which in the examples described below is a WLAN node, provides a first WLAN and a second WLAN with overlapping coverage. The first WLAN is providing connections for a first number of STAs and the second WLAN is providing connections for a second number of STAs, whereby the second number of STAs is a subset of the first number of STAs, the second number of STA's being authorized to connect to the second WLAN.

The WLAN node 110 comprises a detecting module 601 for detecting that a connected STA 120 has the right to access the second WLAN of the WLAN node 110 and an interface unit 606 to facilitate communications between the WLAN node and other nodes or devices, e.g. STAs. The interface may, for example, include a transceiver or a radio circuitry, configured to transmit and receive radio signals over an air interface in accordance with a suitable standard.

The WLAN node 110 is configured to, e.g. by means of the detecting module 601 being configured to, detect that a STA 120 connected to or trying to connect to the first WLAN of the WLAN node 110 has the right to access the second WLAN of the WLAN node. The WLAN node 110 is further configured to, or comprises a sending module 602 configured to, send a message to the STA 120 comprising an indication to the STA 120 to connect to the second WLAN of the WLAN node 110.

The WLAN node 110 may further be configured to, e.g. by means of a receiving module 603 configured to, receive an identifier, which may be used by the WLAN node 110 to identify that the STA 120 is authorized to access the the second WLAN of the WLAN node 110. The WLAN node 110 may further be configured to, e.g. by means of the receiving circuit 603 being further configured to, receive the identifier as a MAC address, an authentication identifier, an International Mobile Subscriber Identity, IMSI, or any other type of identification which may be used by the WLAN node 110 to identify the STA 120.

The sending module 602 and the receiving module 603 may be comprised in the interface unit 606.

Figure 7:
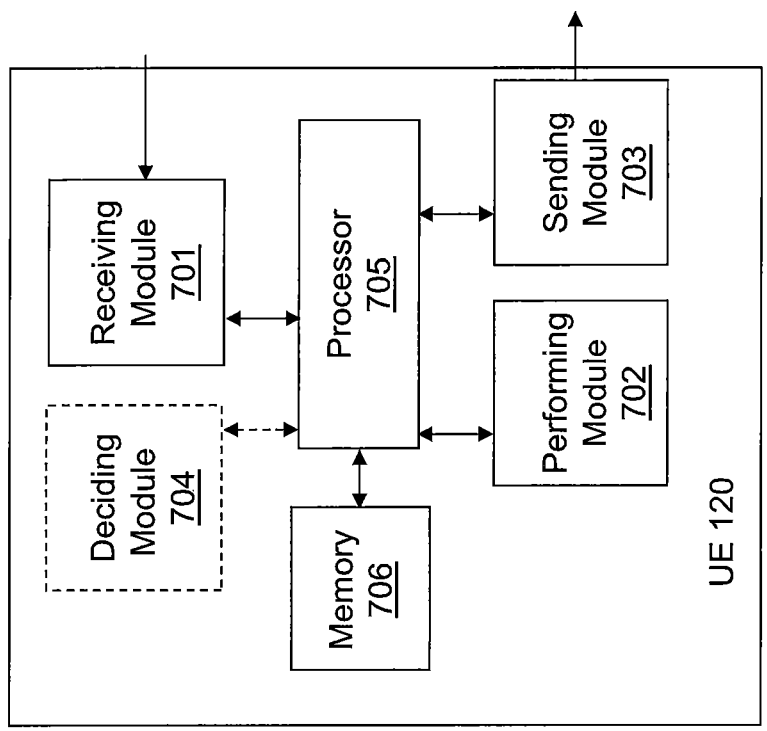
FIG. 7 is a schematic block diagram illustrating embodiments of a STA.

To perform the method actions for selecting a network connection, such as a WLAN connection, as described above in relation to FIG. 5, the STA 120 may comprise the following arrangement depicted in FIG. 7. As mentioned above the STA 120 is connected to or tries to connect to a first network provided by the WLAN node, such as a first WLAN provided by a WLAN node.

The STA 120 comprises a receiving module 701 configured to receive a message from the WLAN node 110, and a performing module 702 configured to perform a hand over from the first WLAN to the second WLAN, according to the indication in the message received from the WLAN node 110.

The STA 120 is configured to, e.g. by means of the receiving module 701 being configured to, receive a message from the WLAN node 110, the message comprising an indication to connect to a second WLAN provided by the WLAN node 110. The STA 120 is further configured to, e.g. by means of the performing module 702 being configured to perform a hand over from the first WLAN to the second WLAN of the WLAN node 110, according to the indication in the message received from the WLAN node 110.

The STA 120 may further be configured to, e.g. by means of a sending module 703 being configured to, send an identifier, which may be used by the WLAN node 110 to identify that the STA 120 is authorized to access the second WLAN of the WLAN node 110. The STA 120 may further be configured to, e.g. by means of the sending module 703 being further configured to, send the identifier as a MAC address, an authentication identifier, an International Mobile Subscriber Identity, IMSI, or any other type of identification which may be used by the WLAN node 110 to identify the STA 120.

The STA 120 may further be configured to, e.g. by means of a deciding module 704 being configured to decide to connect to the second WLAN provided by the WLAN node 110, based on the indication indicated in the message received from the WLAN node 110.

The embodiments herein for handling a WLAN selection of a STA 120 at a WLAN node 110 may be implemented through one or more processors, such as a processor 604 in the WLAN node 110 depicted in FIG. 6, and a processor 705 in the STA 120 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the WLAN node 110 and/or the STA 120. One such carrier may be in the form of a CD ROM disc. It is however feasible with other data carriers such as a memory stick. The computer program code may furthermore be provided as pure program code on a server and downloaded to the WLAN node 110 and/or the STA 120.

The WLAN node 110 and the STA 120 may further comprise a memory 605, 706 comprising one or more memory units. The memory is arranged to be used to store obtained information, measurements, data, configurations, schedulings, and applications to perform the methods herein when being executed in the WLAN node 110 and/or the STA 120.

Those skilled in the art will also appreciate that the detecting module and the performing module described above may refer to a combination of analog and digital circuits, and/or one or more processors configured with software and/or firmware, e.g. stored in the memory, that when executed by the one or more processors such as the processing module in the WLAN node 110 and STA 120 perform as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The sending module 703 and the receiving module 701 may be comprised in a single module, e.g. an interface unit, a transceiver or a radio circuitry.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

What is claimed is:

1. A method performed by a Wireless Local Area Network, WLAN, node for assisting a Station, STA, in selecting a WLAN connection for the STA, wherein the WLAN node provides a first WLAN and a second WLAN with overlapping coverage, the first WLAN providing connections for a first number of STAs and the second WLAN providing connections for a second number of STAs, whereby the second number of STAs is a subset of the first number of STAs, the second number of STAs being authorized to connect to the second WLAN, the method comprising:
   detecting that the STA trying to connect to the first WLAN of the WLAN node is authorized to access the second WLAN of the WLAN node,
   responsive to detecting the STA is authorized to access the second WLAN, sending a message to the STA comprising an indication to the STA to connect to the second WLAN of the WLAN node to prevent the STA from connecting to the first WLAN,
   wherein the indication comprises an identification of the second WLAN of the WLAN node.

2. The method according to claim 1, wherein the identification of the second WLAN of the indication comprises a Service Set Identifier (SSID) of the second WLAN of the WLAN node.

3. The method according to claim 1, wherein sending the message to the STA comprising the indication comprises sending the indication through the second WLAN of the WLAN node to the STA.

4. The method according to claim 1, wherein detecting that the STA trying to connect to the first WLAN of the WLAN node is authorized to access the second WLAN of the WLAN node comprises:
   receiving from the STA an identifier;
   determining the STA is authorized to access the second WLAN of the WLAN node based on the identifier received from the STA.

5. The method according to claim 4, wherein receiving from the STA the identifier comprises receiving from the STA the identifier in a probe request.

6. The method according to claim 4, wherein determining the STA is authorized to access the second WLAN of the WLAN node based on the identifier received from the STA comprises:
   comparing the identifier from the STA to a list of STAs authorized to access the second WLAN; and
   determining the STA is authorized to access the second WLAN based on the comparison.

7. The method according to claim 1, wherein detecting that the STA is trying to connect to the first WLAN comprises receiving a request to access the first WLAN from the STA through the first WLAN.

8. A Wireless Local Area Network, WLAN, node for assisting a Station, STA, in selecting a WLAN connection for the STA, wherein the WLAN node provides a first WLAN and a second WLAN with overlapping coverage, the first WLAN providing connections for a first number of STAs and the second WLAN providing connections for a second number of STAs, whereby the second number of STAs is a subset of the first number of STAs, the second number of STAs being authorized to connect to the second WLAN, the WLAN node comprising:
   a processor coupled to a memory comprising instructions that when executed by the processor causes the processor to operate to:
   detect that the STA trying to connect to the first WLAN of the WLAN node is authorized to access the second WLAN of the WLAN node,
   responsive to detection the STA is authorized to access the second WLAN, send a message to the STA comprising an indication to the STA to connect to the second WLAN of the WLAN node to prevent the STA from connecting to the first WLAN, wherein the indication comprises an identification of the second WLAN of the WLAN node.

9. The WLAN node according to claim 8, wherein the identification of the second WLAN of the indication comprises a Service Set Identifier (SSID) of the second WLAN of the WLAN node.

10. The WLAN node according to claim 8, wherein the processor further operates to send the indication through the second WLAN of the WLAN node to the STA.

11. The WLAN node according to claim 8, wherein the processor further operates to:

receive from the STA an identifier;

determine the STA is authorized to access the second WLAN of the WLAN node based on the identifier received from the STA.

12. The WLAN node according to claim 11, wherein the processor further operates to receive from the STA the identifier in a probe request from the STA.

13. The WLAN node according to claim 11, wherein the processor operates to determine the STA is authorized to access the second WLAN of the WLAN node based on the identifier received from the STA by:

comparing the identifier from the STA to a list of STAs authorized to access the second WLAN; and determining the STA is authorized to access the second WLAN based on the comparison.

14. The WLAN node according to claim 8, wherein the processor further operates to receive a request to access the first WLAN from the STA through the first WLAN.

15. A user equipment, STA, for selecting a WLAN connection, which tries to connect to a first WLAN provided by a WLAN node, the STA comprising:

a processor coupled to a memory comprising instructions that when executed by the processor causes the processor to operate to:

transmit, to the WLAN node, a request to connect to the first WLAN of the WLAN node;

responsive to transmitting the request, receiving, from the WLAN node, a message comprising information identifying a second WLAN of the WLAN node; and connecting to the second WLAN of the WLAN node using the information identifying the second WLAN.

16. The STA according to claim 15, wherein the processor further operates to:

transmit the request to through the first WLAN of the WLAN node; and receive the message comprising the information identifying the second WLAN through the second WLAN of the WLAN node.

* * * * *